United States Patent [19]

Radulescu

[11] Patent Number: 5,515,904
[45] Date of Patent: May 14, 1996

[54] APPARATUS AND PROCESS FOR ALUMINOTHERMIC WELDING

[76] Inventor: Stefan R. Radulescu, 1130 University Ave., Palo Alto, Calif. 94301

[21] Appl. No.: 286,092

[22] Filed: Aug. 4, 1994

Related U.S. Application Data

[63] Continuation of Ser. No. 827,064, Jan. 28, 1992, abandoned.

[51] Int. Cl.$^6$ .......................... B23K 23/00; B22D 19/04
[52] U.S. Cl. ............................... 164/54; 164/133; 249/86
[58] Field of Search ...................... 249/86; 164/53, 164/54, 91, DIG. 12, 133, 137, 360

[56] References Cited

U.S. PATENT DOCUMENTS

| | | | |
|---|---|---|---|
| 3,007,217 | 11/1961 | Ahlert | 249/86 |
| 3,189,959 | 6/1965 | Ahlert | 164/54 |
| 4,250,944 | 2/1981 | Mring | 164/54 |
| 4,694,884 | 9/1987 | Butler | 164/360 |

FOREIGN PATENT DOCUMENTS

| | | | |
|---|---|---|---|
| 474207 | 3/1929 | Germany | 164/DIG. 12 |
| 3113229 | 10/1982 | Germany | 164/360 |
| 1600992 | 10/1981 | United Kingdom | 249/86 |

*Primary Examiner*—Kurt Rowan
*Assistant Examiner*—Randolph S. Herrick
*Attorney, Agent, or Firm*—Townsend and Townsend and Crew

[57] ABSTRACT

The disclosure relates to a mold for aluminothermic welding without preheating of two metal parts, said mold being composed of two mold parts and two sets of cores and having internally employed a mold cavity and two mold channels with cross-sections of elongated shape, extending from underneath the base portion of said mold cavity to the upper side of said mold, said mold channels and the extremities of said base portion being connected together through two connecting ducts with cross-sections of elongated shape on the vertical, the rising channels being employed from recesses of mold channels or cores and complementary channel portions determined by positions of said cores inserted into said mold channels onto positioning means, said mold in which closing gates connecting the upper side of rising channels directly to the atmosphere or to the upper side of head portion of said mold cavity, the invention further relating to a process in which a liquid bath of constant height is created in the welding cavity, while the liquid steel flows through said connecting ducts on the entire height of liquid bath, said process in which the liquid steel solidifies when it flows through said closing gates.

31 Claims, 7 Drawing Sheets

APPARATUS AND PROCESS FOR ALUMINOTHERMIC WELDING

This is a Continuation of application Ser. No. 07/827,064, filed Jan. 28, 1992, now abandoned.

BACKGROUND OF THE INVENTION

1. Field of the Invention

This invention relates to an apparatus and process for aluminothermic welding without preheating of metal parts, with rising channels controlling such process.

2. Prior Art

In aluminothermic welding without preheating of two or more identical or similar metal parts of variable cross-sections, such as rails, aligned in an end-to-end relation, several methods are known in which the amount of heat required to weld the rail ends is supplied solely by the liquid steel alumino-thermically produced.

In one such process and apparatus, described in U.S. Pat. No. 3,189,959, the rail ends are aligned with a gap therebetween and enclosed in a welding mold, which contains rising channels and ventilating ducts. The casting crucible is positioned above the mold and is manually tapped when the aluminothermic reaction is completed. The pouring liquid steel is divided into two stream halves which join in the region of the center of rail web and then fill the welding cavity and the rising channels.

It has been found, however, that the method is subject to several disadvantages. The liquid steel is divided into two stream halves, which are in direct contact with the mold, which is cold at the beginning of welding process. Consequently, the liquid steel loses a part of its heat before it reaches the rail ends. Then, the first portion of liquid steel, which is poured into the welding cavity in the early stage, gives the greatest amount of heat to the rail in the region of center of rail web, where it first reaches the rail ends. As a result, the rail web, which is the thinnest part of the rail, is melted to a greater extent compared to the other portions of rail, and also, the first portion of the liquid steel which reaches the rail bases, and the rail base extremities in particular, could not have the required temperature to properly melt the rail in the region of base extremities. The subsequent liquid steel which is poured into the welding cavity gives the greater amount of heat to the rail in the region of the surface of the rising liquid bath in the welding cavity, and thus it would not have a significant effect in melting the rail bases.

The area of the cross-section of rising channels is practically constant, within known constraints of existing manufacturing technology. Consequently, the rising channels do not control the amount of heat which is given by the liquid steel to the rail in the region of the surface of the rising liquid bath. Thus, the rail is not uniformly melted on the entirety of its cross-section, resulting in internal stresses after the weld is cooled. In particular, the rail web is melted to a greater extent compared to the rail head, and a retreat in the weld in the region between the rail head and the rail web would occur. The rising channels are located above the extremities of rail bases with the result that the liquid bath rises rapidly in the region of rail bases and the rail bases are not properly melted. Further, if the method is used to weld rail sections in an elevated track, for instance in curves, and the center line of mold deviates from the vertical, then the lower base receives a greater amount of liquid steel, with the result that the elevated base would be insufficiently melted.

In the process and apparatus, described in U.S. Pat. No. 4,250,944, the welding operation is performed in a similar manner as in the previous method. However, the two stream halves join along the longitudinal axis of rail, toward the two rail heads. This method is also subject to certain disadvantages. Due to the increased height of the mold, the length of path along which the liquid steel flows from the outlet of the crucible to the extremities of rail bases is inevitably increased, and the liquid steel loses heat until it reaches the rail ends. The liquid steel further loses heat because of the direct impingement realised by the two stream halves onto the center of rail heads. Consequently, the liquid steel loses a significant amount of heat until it reaches the rail bases and the rail bases are not properly melted, resulting in an uncertain weld, especially in the case of a gap of minimum size.

In another process and apparatus, described in U.S. Pat. No. 4,605,053, the rail sections are aligned and enclosed in a welding unit, consisting of a welding mold and a reaction crucible, separated by control disks. The welding mold contains a mold cavity, discharge chambers located underneath the rail base, recesses, exit gates and ventilating ducts. The reaction crucible is located in the upper side of the welding unit, above the gap, between the two rail ends and is automatically tapped when the control disks are melted by the liquid steel. Then the liquid steel fills the mold cavity and the discharge chambers, realising at the same time a direct impingement onto the top of the rail bases.

However, this method is subject to several disadvantages. Given the geometry of the center of the welding cavity and of the recess which is in the wall of mold, the frictional surface of the former is much smaller than the frictional surface of the latter. Also, the wall of the recess inclined toward the center of mold cavity has the effect of a greater speed of the liquid through the center of the welding cavity. Consequently, in the first stage of casting, the liquid flows at a greater speed through the center of the welding mold. Thus, the mold cavity would be completely filled practically with the speed at which the liquid is poured from the reaction crucible, and the first pouring phase, which is the period of time during which the first portion of liquid steel flows along the rail bases and the liquid bath has not started to rise in the welding cavity, would be extremely short. Consequently, the rail bases would not be properly melted in the first stage of pouring, and the subsequent liquid steel poured into the welding cavity would not have a significant effect in melting the rail bases. After the welding cavity has been filled, the liquid flows with a lower speed, and thus it gives the biggest amount of heat to the rail heads. The recess does not apparently bring any benefit to the welding process, but the two pairs of double ribs which inevitably result from the recess provide a major disadvantage in the case of a broken weld, since it is extremely difficult to secure the rail with cover plates until it is properly repaired.

The aluminothermic reaction depends on the composition of the welding material, the extent at which it is dried, the age of the welding material, and other factors. Once the reaction is started, the liquid steel cannot be prevented from pouring into the welding cavity, and in the case of an abnormal progress of the reaction, this would result in a defective weld which has to be cut away, which is time-consuming and expensive. The welding cavity is not provided with means for ventilating the gases which develops therein during the pouring of liquid steel and this would cause pores in the weld. Also, serious difficulties are encountered when this method is used to weld wet rails, as it is the case in cool mornings, because the welding unit is not provided with proper means by which a burner could effectively reach and dry the rail. The burner is a bulky device, which is difficult to fabricate, to handle and to transport, resulting in an expensive mold.

In another process and apparatus, described in U.S. Pat. No. 3,620,291, the rail ends are aligned and enclosed in a welding mold, which contains rising channels, stoppers and ventilating ducts. After the casting crucible is manually tapped, the pouring liquid steel is divided into two stream halves which join in the region of the rail base and then fill the welding cavity and the rising channels.

However, this method is subject to several disadvantages. Practically, the casting operation has two phases. In the former, the discharge channels are closed by means of stoppers, and the welding cavity is filled with liquid steel. The latter phase starts when the stoppers are melted, then the level of the liquid bath decreases until an equilibrium of liquids is obtained between the welding cavity and the rising channels, and finally the welding cavity is filled with liquid steel, at a lower speed than in the first phase. Because of the geometry of welding cavity in the region of rail web and because the area of cross-sections of the rising channels is constant, the rail web receives the biggest amount of heat. The result is that a retreat would appear in the weld in the region between the rail web and the rail head. The liquid bath starts to rise in the welding cavity from the begining of the casting operation, with the result that the rail bases would be insufficiently melted Also, after the welding cavity is filled in the region of rail bases, the liquid flows to the exit gates at the level of the upper side of rail bases, as the exit gates are located at the upper side of the rail bases. Thus, subsequent liquid steel poured into the welding cavity would not have a significant effect in melting the rail bases. Furthermore, if the center line of the mold deviates from the vertical, as it is the case in an elevated track, the elevated base would be insufficiently melted.

In another process and apparatus, described in Romania Pat. No. 80,214, the rail ends are positioned with a gap therebetween and enclosed in a welding mold, which contains stepped rising channels, connecting gates and ventilating ducts. The area of the cross-section of a rising channel varies along said channel in such a manner that areas in the longitudinal section of different portions of a channel are proportional to areas of corresponding portions of rail. After a casting crucible is manually tapped, a single liquid stream flows into the welding cavity centrally through the gap and fills the welding cavity and the rising channels.

However, this method is subject to several disadvantages. The connection from the welding cavity to a rising channel is employed by a pair of connecting ducts located in the region of rail base, more specifically, at the upper side of base portion of the welding cavity. Consequently, the cooled liquid steel cannot be entirely eliminated from the lower side of welding cavity in the region of the extremities of rail base, especially when rails of large size are to be welded. Because the two cores used in employing the rising channels are in an inter-dependent relation, the rising channels are not sufficiently large in the region of rail head, and the rail head would not be properly melted. The rising channels are significantly conic along their heights to allow the cores to effectively be positioned into the rising channels, with the result that the volume of the lower side of rising channels would not be sufficient to properly melt the rail bases. Therefore, the mold requires large rising channels, which in turn require an increased longitudinal dimension of the mold. This prevents it from being used in performing welds in narrow spaces, which is the case of high-speed switches and of switches having a single-piece heart. Finally, technical difficulties are encountered when the stepped rising channels are to be employed with inter-dependent cores.

SUMMARY OF THE INVENTION

These disadvantages are overcome by the present invention by creating a novel apparatus, as well as a novel process. The present invention comprises a mold composed of two mold parts and two sets of cores, said mold having internally employed a mold cavity and two mold channels located on each side of the mold cavity. It is an objective of the present invention to provide a mold of reduced length which is able to perform welds in narrow spaces by employing mold channels with cross-sections of elongated shape in a direction parallel with the transversal axis of mold. The mold channels extend from underneath the base portion of mold cavity to the upper side of mold and the rising channels of mold are employed by inserting the sets of cores into the mold channels, such that the rising channels have variable cross-sections and the lower side of rising channels is identical with the lower side of the mold channels. It is another objective of the present invention to provide positioning means of cores employed within the mold channels, by which the errors in employing the rising channels are effectively eliminated. It is further an objective of the present invention to greatly increase the volume of the lower side of rising channels by providing mold channels substantially of constant area along their heights and by employing positioning means partially within the perimeter of cross-sections of mold channels.

The rising channels are employed from recesses in the mold channels or cores and from complementary channel portions determined by the positions of cores within the mold channels. It is another objective of the present invention to provide closing gates at the upper side of rising channels connecting directly to the atmosphere or to the upper side of head portion of mold cavity.

The extremities of the base portion of mold cavity are connected with each rising channel through two connecting ducts having cross-sections of elongated shape in a direction parallel with the vertical axis of the mold and extending from the lower side to the upper side of extremities of base portion. The metal parts are aligned in an end-to-end relation with a gap therebetween and surrounded by the mold parts. The welding process according to the present invention is commenced by pouring liquid steel into the welding cavity. It is another objective of the present invention to conduct the flowing liquid steel through the connecting ducts from the beginning of pouring operation, while creating in the base portion of welding cavity at the end of the first stage of pouring a liquid bath of constant height, which is continuously refreshed by the pouring hot steel, the base portions of metal parts being properly melted from center to extremities.

The gases which are formed in the rising channels are evacuated through closing gates located at the upper side of rising channels and the liquid steel eventually fills the welding cavity and the rising channels. It is further another objective of the present invention to solidify the liquid steel when it flows through the closing gates, by which the extremities of base portions of metal parts receive the same amount of heat.

BRIEF DESCRIPTION OF THE DRAWINGS

The invention will be further illustrated by reference to the accompanying drawings, in which.

DETAILED DESCRIPTION OF THE INVENTION

Figure 1:
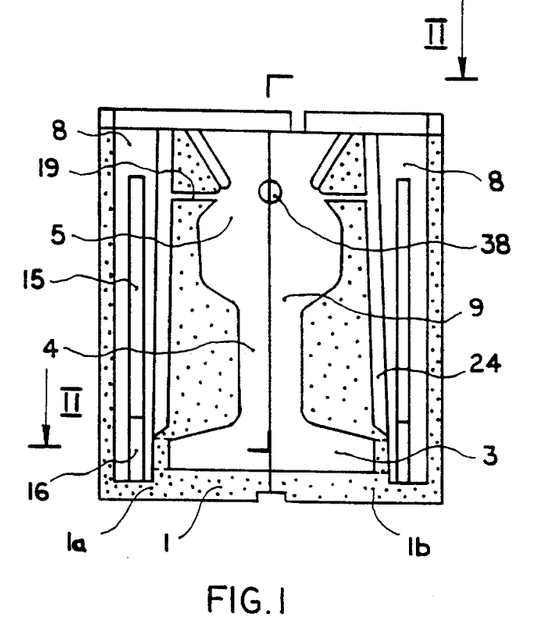
FIG. 1 is the longitudinal sectional view upon the plane I—I according to FIG. 2 of the mold of the preferred embodiment.

Refering to the drawings, the mold according to the preferred embodiment of the present invention for aluminothermic welding without preheating of two identical or similar metal parts of variable cross-section is shown in FIG. 1. The description is made with reference to the welding of rail ends aligned in an end-to-end relation, but this should not limit the scope or domain of application of the inventive apparatus and process.

Figure 2:
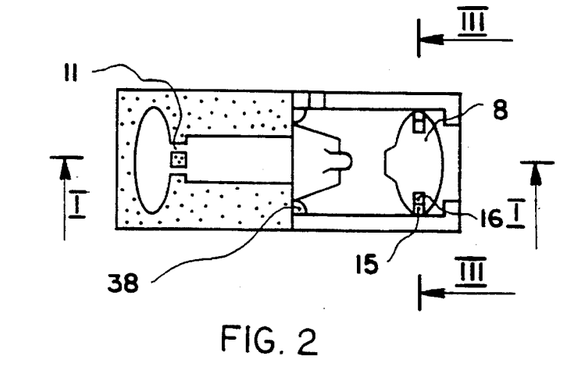
FIG. 2 is the half-sectional view upon the plane II—II according to FIG. 1.

The mold 1 is composed of two mold parts 1a and 1b made from a mixture based on quartz sand and two sets of cores made of the same material. The mold 1 has internally employed a mold cavity 9 which resembles the shape of metal parts and which has a base portion 3, a web portion 4 and a head portion 5 corresponding to appropriate portions of metal parts. The mold has further internally employed two identical mold channels 8, one in each mold part. The mold channels have cross-sections of elongated shape on a direction parallel with the transversal axis of the mold, as shown in FIG. 2. A consequent result is that the length of the mold is greatly reduced, and this is particularly useful when the mold is employed in performing welds in narrow spaces.

Figure 3:
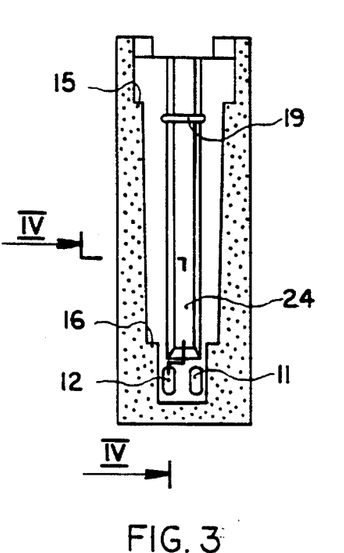
FIG. 3 is the vertical sectional view upon the plane III—III according to FIG. 2 through a mold channel.

The mold channels 8 are located at the extremities of the mold cavity 9, in a respective relation of symetry with respect to the mold cavity. The mold channels are preferably located on each side of the mold cavity 9 and they extend from underneath the base portion 3 of the mold cavity to the upper side of the mold. Each of the mold channels 8 and the base portion 3 of the mold cavity 9 are connected together through one connecting duct 11 and one connecting duct 12, each having the cross-section of elongated shape in a direction parallel with the vertical axis of the mold, as shown in FIG. 3. The connecting ducts are located symetrically with respect to the longitudinal axis of the mold 1, connecting the extremities of base portion 3 of the mold cavity with the lower side of each of the mold channels 8. The connecting ducts extend from the lower side of base portion 3 entirely to the upper side of base portion, at the extremities of base portion of the mold cavity. The width of connecting ducts is between 1:15 to 1:1 of their height.

Figure 4:
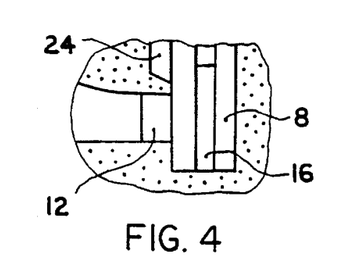
FIG. 4 is the partial sectional view upon the plane IV—IV according to FIG. 3 through a connecting duct.

One of mold channels 8 is located in each mold part and it has internally employed one recess 24 which extends partially along the mold channel, above the connecting ducts 11 and 12, as shown in FIG. 4.

The mold 1 is provided with one closing gate 19 connecting the upper side of each mold channel 8 and the upper side of head portion 5 of the mold cavity. The closing gate has the cross-section of elongated shape in a direction parallel with the horizontal axis of the mold.

Figure 5:
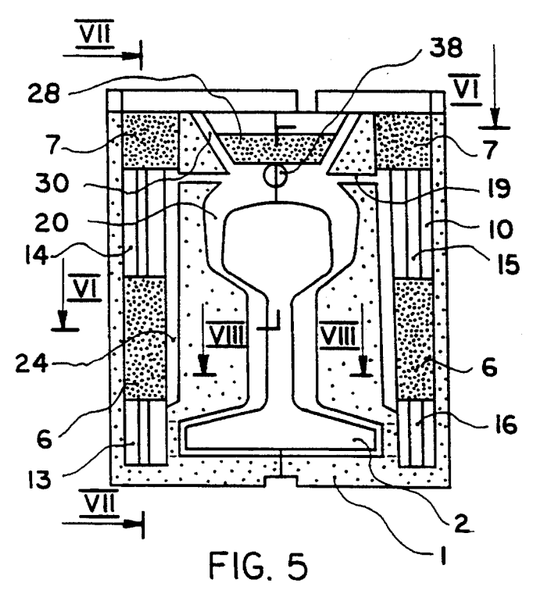
FIG. 5 is the longitudinal sectional view upon the plane V—V according to FIG. 6 of the mold with cores of the preferred embodiment surrounding the metal parts.

Each of the sets of cores is composed of two cores 6 and 7, as shown in FIG. 5. Positioning means 15 and 16, such as, but not limited to, dimensional thresholds or shoulders, are employed within the two mold channels 8, by which the cores 6 and 7 can be independently positioned into the mold channels.

The positioning means are configured as dimensional thresholds or shoulders within the rising channels to reduce the amount of space that the positioning means occupy within the rising channels. The mold channels 8 have cross-sections of substantially constant area along their heights with the exception of little variations which occur at the height of positioning means, where the area of cross-sections of mold channels decreases with the size of area of the cross-sections of positioning means. However, since the positioning means are configured to occupy a small amount of space within the rising channels, the volume of the lower side of the mold channels is less decreased.

Figure 6:
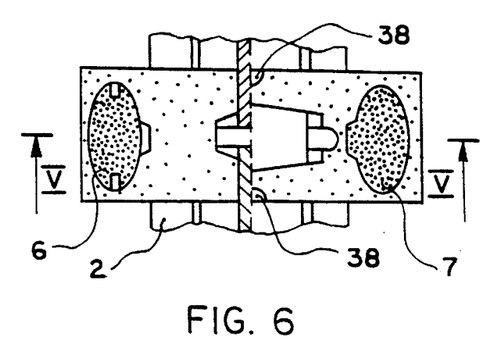
FIG. 6 is the sectional view upon the plane VI—VI according to FIG. 5.
Figure 7:
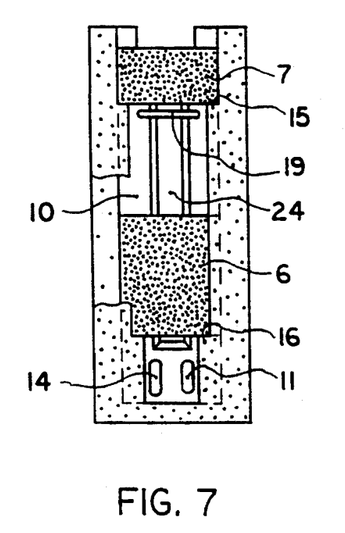
FIG. 7 is the vertical sectional view upon the plane VII—VII according to FIG. 5, partly removed, through a rising channel.

As illustrated in FIGS. 6 and 7, the outer geometries of the cores 6 and 7 have dimensions allowing them to be positioned within the rising channels. In this way, the cores 6 and 7 may be positioned independently of each other within the rising channel, with the core 6 being below the core 7, and with each core 6, 7 resting upon its respective positioning means. From within each of the sets of cores, one core 7 of the two cores and the upper side of one of the mold channels have identical cross-sections, as shown in FIG. 7.

The sets of cores are inserted into the mold channels onto the positioning means 15 and 16, as also shown in FIG. 6, by which the rising channels 10 of the mold are employed from the recesses 24 of mold channels and the complementary channel portions 13 and 14 determined by the positions of cores 6 and 7 in the mold channels, such that the recesses and the channel portions are connected together, and the lower side of rising channels is identical with the lower side of mold channels. Thus, the errors in employing the rising channels are effectively eliminated while the manufacturing process of the mold is greatly simplified. The cores are secured in a known manner against rising in the rising channels.

The positioning means of cores and the dimensions of cores determine that the channel portions 13 and 14 of rising channels correspond to the base portion 3 and head portion 5 of mold cavity, respectively. The connection of the upper side of rising channels directly to the atmosphere is obturated by the core 7. The rising channels are connected with the upper side of head portion of the mold cavity by the closing gates 19.

Figure 8:
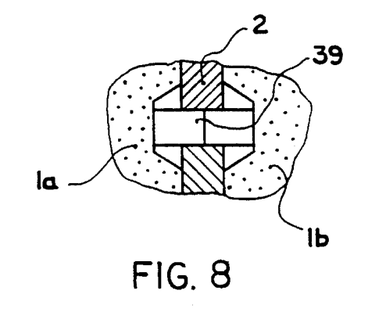
FIG. 8 is the partial sectional view upon the plane VIII—VIII according to FIG. 5, through the web portion of welding cavity.

The metal parts 2 are aligned in an end-to-end relation with a gap 39 therebetween and are surrounded by the mold parts 1a and 1b, as shown in FIG. 8. Thus, the welding cavity 20 of the mold is employed from the mold cavity 9 with the limitations given by the metal parts, such that a space is formed around the metal parts. The two mold parts conjointly form two ventilating ducts 38, which connect the upper side of head portion of welding cavity directly to the atmosphere.

The welding process of the invention is commenced by manually tapping a casting crucible placed above the mold when the aluminothermic reaction is completed. Pouring of liquid steel into the welding cavity 20 is employed indirectly, with a accumulation rate within the welding cavity which is entirely controlled by the area of cross-sections of the connecting ducts 11 and 12, as well as by the area of cross-sections of inflow ducts 30 located at the upper side of head portion of the welding cavity 20. The liquid steel is divided by the horizontal bar 28 into two stream halves which flow through the inflow ducts 30 and join in the region of rail head. Then the liquid steel flows to the region of rail base and to the rising channels.

The first portion of liquid steel is quickly cooled because it reaches regions of rail and mold which are cold at the begining of pouring operation. Because the connecting ducts 11 and 12 extend from the lower side to the upper side of base portion of the welding cavity 20 at the extremities of the welding cavity, the liquid steel flows through the connecting ducts from the begining of pouring operation and the cooled liquid steel is replaced by the pouring liquid steel.

Furthermore, the connecting ducts have cross-sections of elongated shape in a direction parallel to the vertical axis of the mold such that to allow only a part of the pouring liquid steel to flow to the rising channels 10 at the begining of pouring operation, while the rest of liquid steel accumulates in the welding cavity 20 in the form of a liquid bath.

Figure 23:
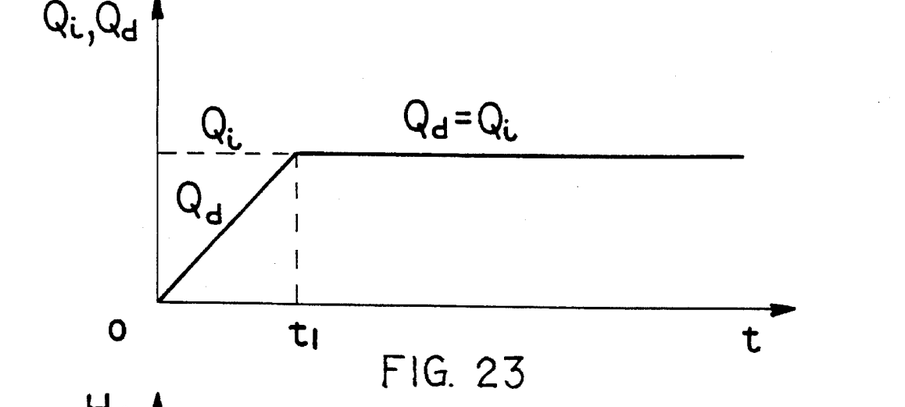
FIG. 23 represents the variation of the discharge flow of liquid steel through the connecting ducts and the incomming flow of liquid steel into the welding cavity.

FIG. 23 represents the schematic diagram of variation of the discharge flow Qd of liquid steel through the connecting ducts and the incomming flow Qi of liquid steel into the welding cavity. As the liquid steel is further poured into the welding cavity, the height of liquid bath rises, which results in a gradual increase of the cross-section of liquid steel flowing through the connecting ducts. The liquid steel flows through the connecting ducts with a variable increasing discharge flow until the discharge flow Qd equals the incomming flow Qi of liquid steel into the welding cavity, at time t1, when the first stage of pouring is finished. Thus, in the first stage of pouring, the discharge flow Qd varies from zero to the value of the incomming flow Qi. The liquid steel then flows through the connecting ducts with a constant discharge flow until the height of liquid steel from the lower side of rising channels equals the height of liquid bath from the welding cavity, and then the discharge flow remains constant until the end of pouring operation.

Figure 24:
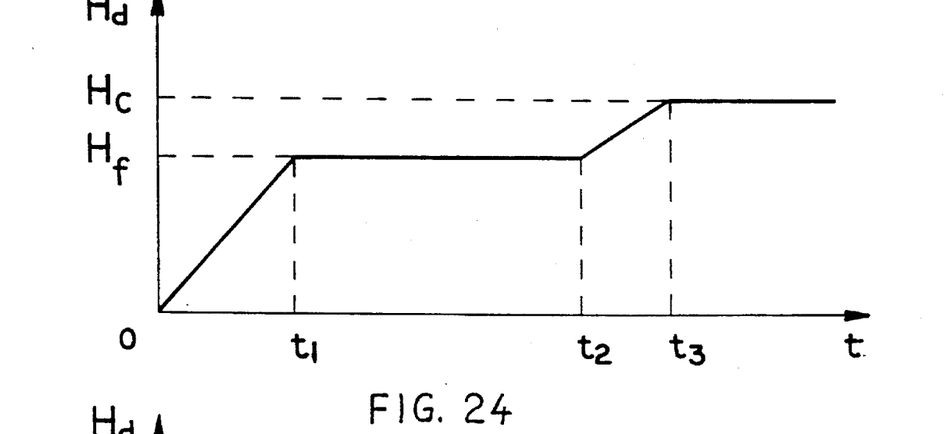
FIG. 24 represents the variation of the height of cross-section of liquid steel flowing through the connecting ducts of the mold of the preferred embodiment.

FIG. 24 represents the schematic diagram of the variation of the height Hd of cross-section of liquid steel flowing through the connecting ducts. In the first stage of pouring, as the liquid steel is poured into the welding cavity, the height of liquid bath increases more quickly than the height of liquid steel in the lower side of the rising channels, which results in an increase of Hd from zero to Hf, which is the height of liquid steel flowing through the connecting ducts a time t1, when the first stage of pouring is finished. A liquid bath of constant height is created in the base portion of the welding cavity at the end of the first stage of pouring. Further the liquid steel flows with a cross-section of constant height Hf through the connecting ducts, until the height of liquid steel in the lower side of the rising channels equals the height of liquid bath in the welding cavity at time t2. In the time interval from t1 to t2, which is a period of time sufficiently long, the height of liquid bath is constant while the liquid bath is continuously refreshed by the pouring hot steel, and the rail base is continuously washed entirely from center to extremities on a height equal with the height of extremities of rail base. Thus the heat transfer between the liquid steel and the base portions of metal parts is greatly increased and the rail base is properly melted on its entire length. Further the liquid steel rises simultaneously in the welding cavity and rising channels and Hd rises from Hf to the height Hc of connecting ducts at time t3, and then Hd remains constant until the end of pouring operation, when the welding cavity is completely filled with liquid steel. The dimensions of the connecting ducts are employed to control the height of the liquid bath in the welding cavity at the end of the first stage of pouring. The connecting ducts will usually have a width to height ration in the range between 1:15 to 1:1. Such a ratio will allow the height dimension of the liquid bath within the welding cavity to be in the range from between 1/15 of the height of the connecting ducts to the same height as the height of the connecting ducts at the end of the first stage of pouring.

During the pouring operation, gases develops in the rising channels and the welding cavity. The operation of ventilating the rising channels 10 is employed through the closing gates 19, connecting the rising channels to the upper side of head portion of the welding cavity, while the ventilation of the welding cavity is employed through the ventilating ducts 38. The pouring liquid steel eventually fills the welding cavity and the rising channels. Having cross-sections of variable area along their heights, the rising channels directly control the process of melting the metal parts from the welding cavity, hereby the height of liquid bath from the welding cavity, as well as the height of liquid steel in the rising channels, increases with a speed inversely proportional with the area of cross-sections of portions of metal parts. Thus, the amount of heat received by larger portions of metal parts is greater than the amount of heat received by smaller portions of metal parts. The liquid steel also fills the space around the metal parts to create a rib surrounding the weld. The closing gates 19 are sufficiently narrow, such that the cooled liquid steel solidifies when it flows through the closing gates, with the result that the same amount of steel accumulates in each rising channel. Therefore, the extremities of rail base receive the same amount of heat even when the vertical axis of mold deviates from the vertical, and this is particularly useful in employing welds in elevated track, as it is the case in curves. After the liquid steel is cooled in the welding cavity, this process effectively employes a homogenuous weld of the two metal parts, wherein the depth on which the metal parts are melted is directly proportional with the area of cross-section of portions of metal parts.

Figure 9:
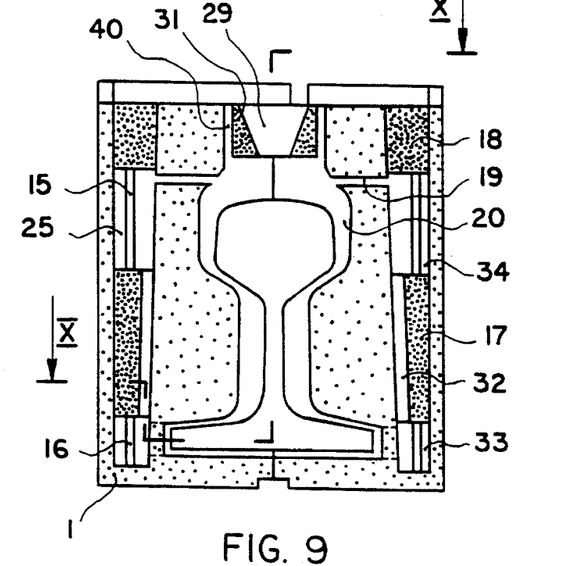
FIG. 9 is the longitudinal sectional view upon the plane IX—IX according to FIG. 10 of the mold with cores of an alternate embodiment, surrounding the metal parts.
Figure 10:
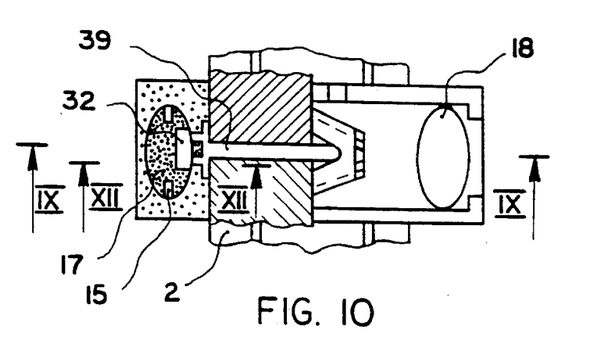
FIG. 10 is the half-sectional view upon the plane X—X according to FIG. 9.

An alternate embodiment of the present invention is shown in FIG. 9. The mold channels comprise the positioning means 15 and 16, and they do not have internally employed recesses. Each of the sets of cores is composed of two cores 17 and 18. The core 17 has externally employed one recess which extends the entire height of core, as shown in FIG. 10.

Figure 11:
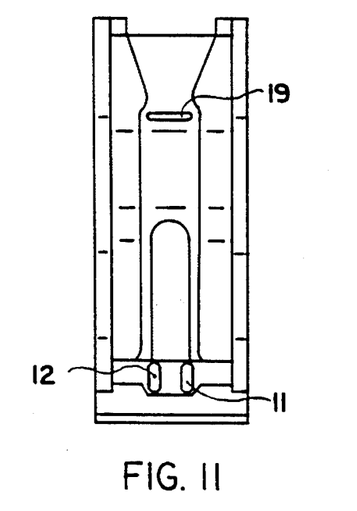
FIG. 11 is the internal lateral view of a mold half of an alternate embodiment.
Figure 12:
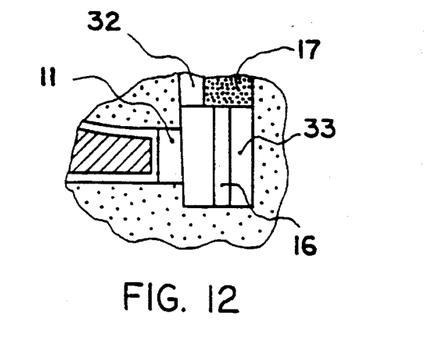
FIG. 12 is the partial sectional view upon the plane XII—XII according to FIG. 10 through a connecting duct.

The sets of cores are inserted into the mold channels onto the positioning means 15 and 16, by which the rising channels 25 of the mold are employed from the recesses 32 of the cores 17 and the complementary channel portions 33 and 34. Each of the rising channels and the base portion of the welding cavity are connected together through two connecting ducts 11 and 12, as shown in FIGS. 11 and 12.

The welding process is similar to the process described in the preferred embodiment. However, the liquid steel is directly poured through the inflow gate 29 of entrance guiding core 31. The ventilation of rising channels 25 is employed through the closing gates 19, while the ventilation of the welding cavity is employed through the ventilating ducts 40. The solidification of liquid steel in the rising channels is commenced when it flows through the closing gates.

Figure 13:
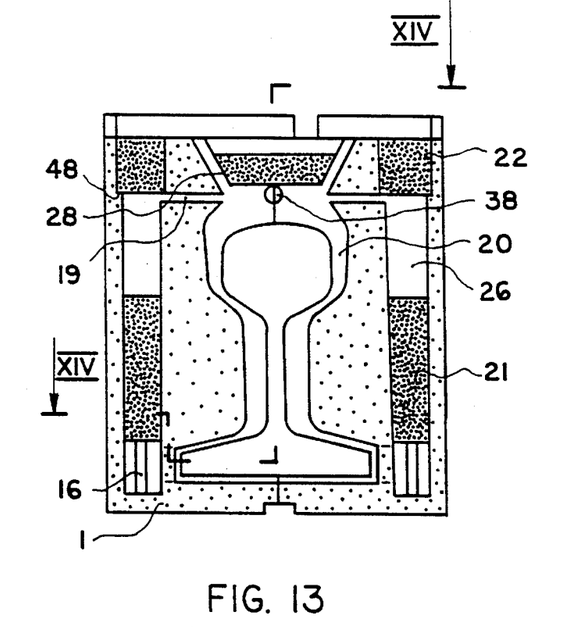
FIG. 13 is the longitudinal sectional view upon the plane XIII—XIII according to FIG. 14 of the mold with cores of another alternate embodiment, surrounding the metal parts.
Figure 14:
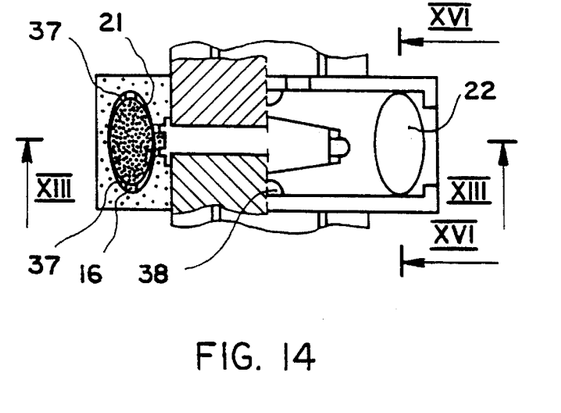
FIG. 14 is the half-sectional view upon the plane XIV—XIV according to FIG. 13.
Figure 15:
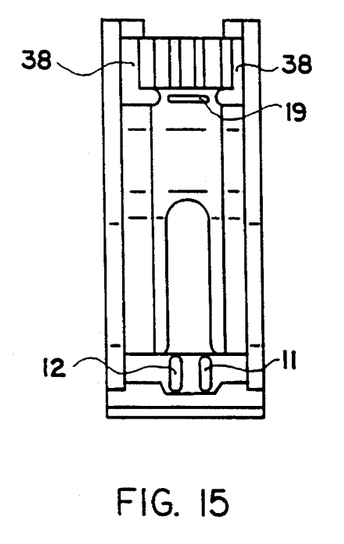
FIG. 15 is the internal lateral view of a mold half of another alternate embodiment.
Figure 16:
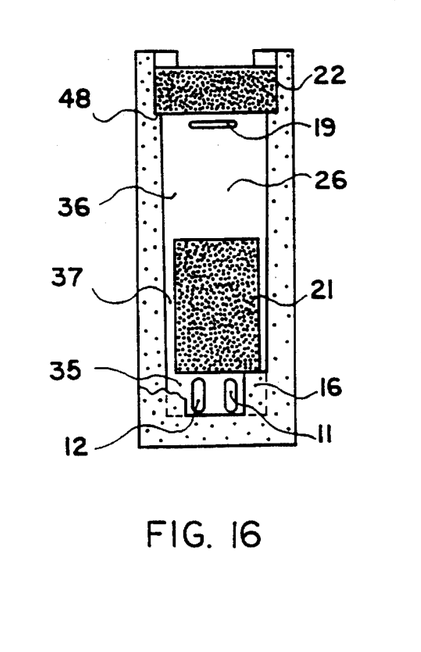
FIG. 16 is the vertical sectional view upon the plane XVI—XVI according to FIG. 14, partly removed, through a rising channel.

Another alternate embodiment of the present invention is shown in FIG. 13. The mold channels of the mold comprise the positioning means 48 and 16, and they do not have internally employed recesses. The mold channels are each matched with one set of cores such that the contour of cross-sections of the cores 21 and 22 is included within the contour of cross-sections of the mold channels at the height of positioning means, as shown in FIG. 14. The rising channels 26 of the mold are employed from the complementary channel portions 35 and 36 and the spaces 37, which are formed between the cores 21 and the walls of mold channels, as shown in FIG. 16. The channel portions are determined by the positions of cores in the mold channels. The ventilation of the entire mold is employed through the ventilating ducts 38, as shown in FIG. 15.

Figure 17:
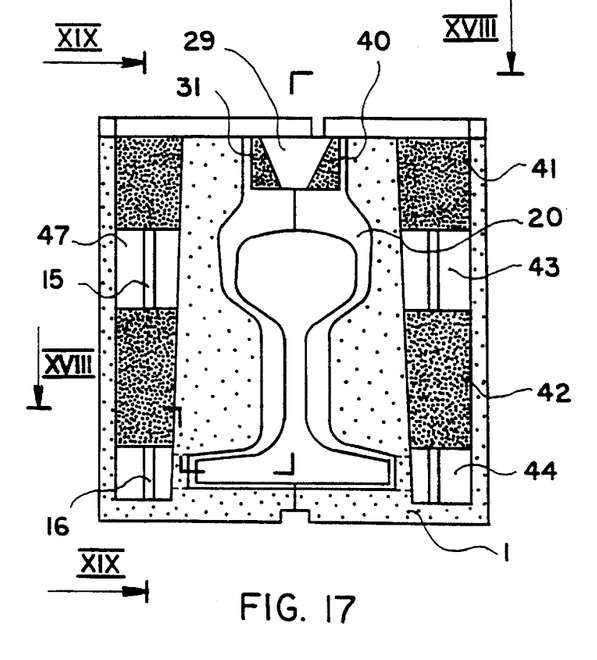
FIG. 17 is the longitudinal sectional view upon the plane XVII—XVII according to FIG. 18 of the mold with cores of another alternate embodiment, surrounding the metal parts.
Figure 18:
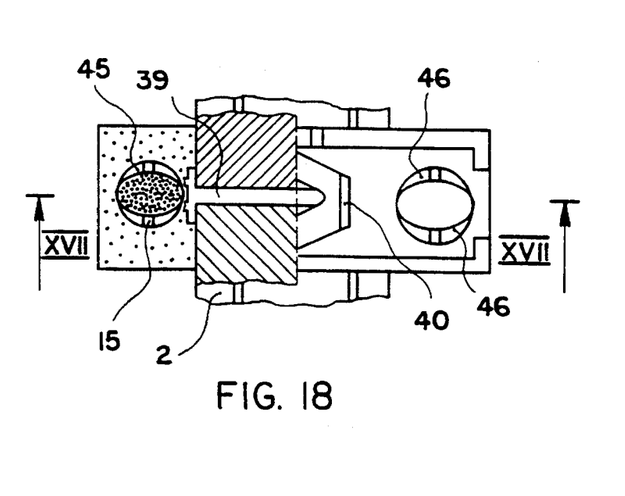
FIG. 18 is the half-sectional view upon the plane XVIII—XVIII according to FIG. 17.
Figure 19:
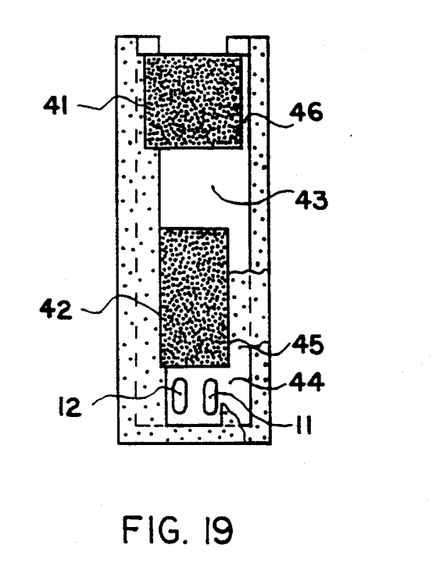
FIG. 19 is the vertical sectional view upon the plane XIX—XIX according to FIG. 17, partly removed, through a rising channel.

Another alternate embodiment of the present invention is shown in FIG. 17. Each of the sets of cores is composed of one core 41 and core 42. The mold channels of the mold have cross-sections of regular shape, as shown in FIG. 18. The mold channels are each matched with one of the sets of cores such that the contour of cross-sections of the cores 41 and 42 of each of the sets of cores is included within the contour of cross-section of one of the mold channels at the height of positioning means. The rising channels 47 of the mold are employed from the complementary channel portions 43 and 44 and the spaces 45. The rising channels extend to the upper side of the mold and they are provided with two closing gates 46, which are located at the upper side of each of the rising channels 47 and are formed between the cores 41 and the walls of mold channels, as shown in FIG. 19. The closing gates connects the rising channels directly to the atmosphere. The ventilation of the welding cavity is employed through the ventilating ducts 40.

Figure 20:
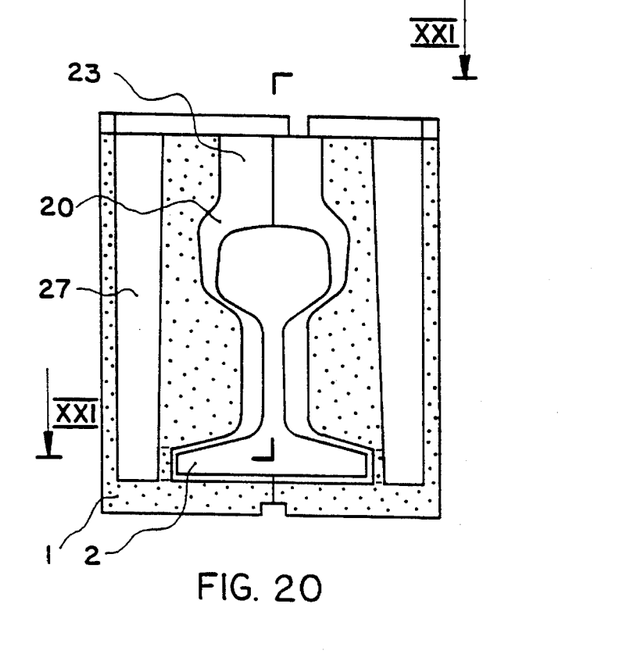
FIG. 20 is the longitudinal sectional view upon the plane XX—XX according to FIG. 21 of the mold of another alternate embodiment, surrounding the metal parts.
Figure 22:
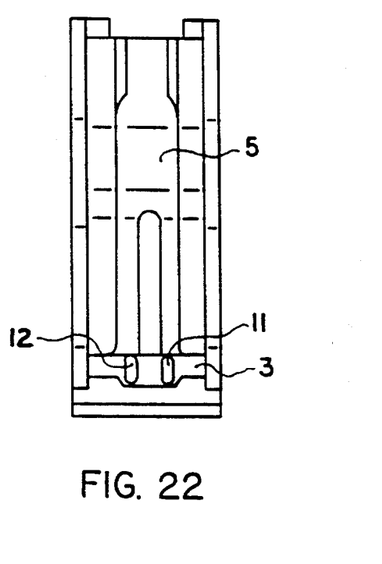
FIG. 22 is the internal lateral view of a mold half of another alternate embodiment.

Another alternate embodiment of the present invention is shown in FIG. 20. The mold 1 has internally employed two mold channels 27, which are located at the extremities of the mold cavity. The base portion 3 of the mold cavity and each of the mold channels are connected together through two connecting ducts 11 and 12 with the cross-sections of elongated shape on the vertical, as shown in FIG. 22. The mold channels extend from the lower region of base portion of the mold cavity to the upper side of the mold. The mold channels have cross-sections substantially of constant area along their heights and they do not have internally employed positioning means or recesses.

Figure 21:
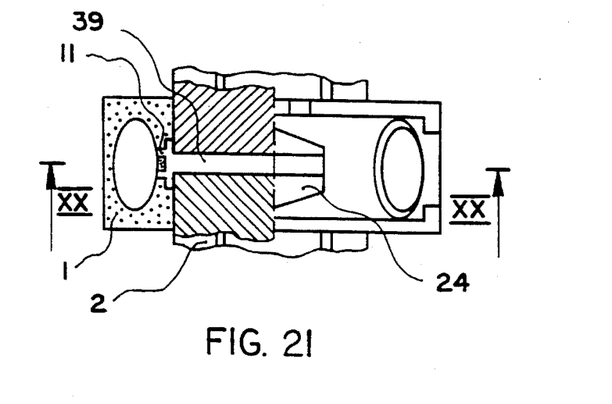
FIG. 21 is the half-sectional view upon the plane XXI—XXI according to FIG. 20.

The mold channels 27 have cross-sections of elongated shape on a direction parallel with the transversal axis of the mold, with the result that the length of the mold is greatly reduced, as shown in FIG. 21. The mold does not comprise sets of cores, and consequently, the rising channels of the mold are equivalent with the mold channels.

The welding process is commenced similarly to the process described in the preferred embodiment. However, the liquid steel is directly poured through the inflow gate 23 into the base portion of welding cavity 20. The ventilation of the welding cavity is also employed through the inflow gate 23.

Figure 25:
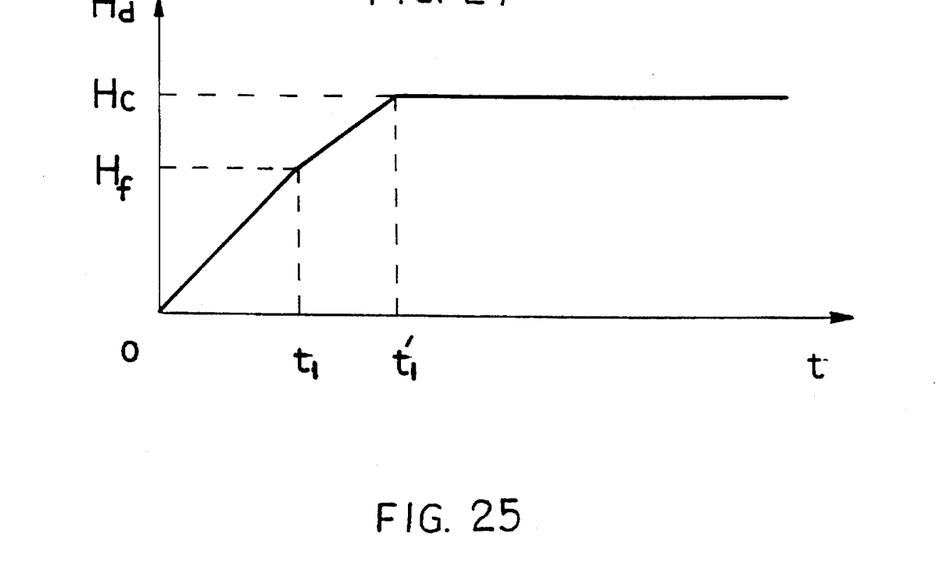
FIG. 25 represents the variation of the height of liquid steel flowing through the connecting ducts of the mold of another alternate embodiment, in which the mold channels extend upwardly from the lower region of base portion of the mold cavity.

FIG. 25 represents the schematic diagram of variation of the height Hd of cross-section of liquid steel flowing through the connecting ducts. The shape of cross-sections of connecting ducts is elongated on the vertical such that at the begining of pouring operation only a part of the liquid steel flows through the connecting ducts to the rising channels, while the rest of liquid steel accumulates in the welding cavity in the form of a liquid bath. In the first stage of pouring, as the liquid steel is poured into the welding cavity, the height of liquid bath increases more quickly than the height of liquid steel in the lower side of the rising channels. In the time interval from the begining of pouring operation to time t1, a liquid bath is created in the base portion of welding cavity with a height greater than the height of liquid steel in the lower side of the rising channels. The liquid steel flows with an increasing variable discharge flow through the connecting ducts to the lower side of rising channels until the discharge flow equals the incomming flow of liquid steel into the welding cavity, at time t1, when the first stage of pouring is finished. Thus, Hd rises from zero to Hf, which is the height of liquid steel flowing through the connecting ducts at the end of the first stage of pouring. After the time t1, the height of liquid bath in the welding cavity rises simultaneously with the height of liquid steel in the rising channels, and Hd rises to the height Hc of the connecting ducts in the time interval from t1 to t1' and then Hd remains constant until the end of pouring operation.

Although several embodiments of the invention have been illustrated in the accompanying drawings and described in the foregoing Detailed Description, it will be obvious to those skilled in the art that the invention is not limited to the embodiments disclosed, but is capable of many rearrangements, modifications and substitutions of parts and elements without departing from the scope and spirit of the invention, and the invention includes all such rearrangements, modifications and substitutions.

What is claimed is:

1. An exothermic welding mold for aluminothermic welding without preheating of similar metal parts of variable cross-section along their heights, said mold comprising:

at least two mold parts which are joined together, said mold having internally employed a centrally located mold cavity, wherein said mold cavity is configured to accept the metal parts and has at least a base portion and a head portion; and at least two rising channels located at extremities of said mold cavity on each side of said mold cavity and extending from a region lower than said base portion of said mold cavity to an upper side of said mold, said rising channels being connected with extremities of said base portion of said mold cavity.

2. A mold according to claim 1, wherein said rising channels have an area of horizontal cross-sections substantially proportional to an area of horizontal cross-section of said mold cavity.

3. A mold according to claim 1, wherein each of said rising channels has a substantially constant cross-sectional area.

4. A mold according to claim 1, wherein said rising channels have a height approximately equal to a height of said mold cavity.

5. A mold according to claim 1, comprising at least one closing gate located at an upper side of each of said rising channels and connecting said rising channels directly to atmosphere.

6. A mold according to claim 1, wherein the rising channels have cross-sections of elongated shape in a direction parallel with a transversal axis of said mold.

7. A mold according to claim 1, further comprising at least one core positionably mounted within each of said rising channels for adjusting the area of horizontal cross-section.

8. An exothermic welding mold for aluminothermic welding without preheating of similar metal parts of variable cross-section along their heights, said mold comprising:

at least two mold parts which are joined together, said mold having internally employed a centrally located mold cavity, wherein said mold cavity is configured to accept the metal parts and has at least a base portion and a head portion;

said mold further having internally employed at least two rising channels located at extremities of said mold cavity on each side of said mold cavity and extending to an upper side of said mold, said base portion of said mold cavity and said rising channels being connected together;

at least two cores positionably mounted within each of said rising channels for adjusting the area of horizontal cross-section; and positing means disposed within said rising channels for positioning said cores in one of said rising channels independently with respect to each other.

9. A mold according to claim 8, wherein said rising channels have an area of horizontal cross-sections substantially proportional to an area of horizontal cross-section of said mold cavity.

10. A mold according to claim 8, wherein each of said rising channels has at least one recess which extends at least partially along a vertical sidewall of each of said rising channels.

11. A mold according to claim 8, wherein each of said cores has at least one recess which extends vertically along an entire side of each of said cores.

12. A mold according to claim 8, wherein each of said positioning means disposed within said rising channels comprises at least one mounting point.

13. A mold according to claim 8, wherein a contour of an exterior surface of said cores is different than a contour of an interior surface of said rising channels forming a rising channel inner space.

14. A mold according to claim 8, comprising at least one closing gate located at an upper side of each of said rising channels and connecting said rising channels directly to atmosphere.

15. A mold according to claim 8, comprising rising channels with cross-sections of elongated shape in a direction parallel with a transversal axis of said mold.

16. A mold according to claim 8, wherein said rising channels extend from a region lower than said base portion of said mold cavity.

17. A mold according to claim 8, wherein said rising channels have a height approximately equal to a height of said mold cavity.

18. A mold according to claim 17, comprising at least one closing gate connecting an upper side of each of said rising channels and an upper side of said head portion of said mold cavity, wherein one of said cores closes an upper side of one of said rising channels.

19. An exothermic welding mold for aluminothermic welding without preheating of similar metal parts of variable cross-section along their heights, said mold comprising:

at least two mold parts which are joined together, said mold having internally employed a centrally located mold cavity, wherein said mold cavity is configured to accept the metal parts and has at least a base portion and a head portion;

said mold further having internally employed at least two rising channels located at extremities of said mold cavity on each side of said mold cavity and extending to an upper side of said mold; and at least two connecting ducts with vertically elongated cross-sections connecting the extremities of said base portion of said mold cavity with each of said rising channels and extending from a region adjacent the lowest side of said base portion to a height not exceeding an upper side of said base portion at the extremities of said base portion of said mold cavity, said connecting ducts being located symmetrically with respect to a longitudinal axis of said mold.

20. A mold according to claim 19, wherein said rising channels have an area of horizontal cross-section substantially proportional to an area of horizontal cross-section of said mold cavity.

21. A mold according to claim 19, wherein each of said rising channels has a substantially constant cross-sectional area.

22. A mold according to claim 19, wherein said rising channels extend from a region lower than said base portion of said mold cavity.

23. A mold according to claim 19, wherein said rising channels have a height approximately equal to a height of said mold cavity.

24. A mold according to claim 19, wherein a width of said connecting ducts is between 1:15 and 1:1 of a height of said connecting ducts.

25. A mold according to claim 19, further comprising at least one core positionably mounted within each of said rising channels for adjusting the area of horizontal cross-section.

26. A mold according to claim 25, further including positioning means disposed within said rising channels for mounting said cores into said rising channels.

27. A process for aluminothermic welding without preheating of similar metal parts, said process wherein the metal parts are aligned within a mold with a gap therebetween whereby a welding cavity of said mold is centrally employed within said mold, the process comprising:

pouring liquid metal into said welding cavity and controlling the rate of accumulation of the liquid metal within the welding cavity by an area of cross-section of a plurality of connecting ducts which are coupled between said welding cavity and a plurality of rising channels located on each side of said welding cavity and extending below a base portion of said welding cavity;

flowing liquid metal in a first stage of operation through said connecting ducts from a beginning of pouring operation with an increasing discharge flow rate until the discharge flow rate equals the incoming flow rate of liquid metal into said welding cavity;

creating a liquid bath of constant height in said base portion of said welding cavity at an end of the first stage of pouring operation, with the liquid bath being continuously refreshed by the incoming liquid metal so that the liquid bath has a higher temperature than the liquid metal discharged into said rising channels; and flowing liquid metal through said connecting ducts at a constant discharge flow rate until a height of liquid metal within said rising channels equals the height of liquid bath within said welding cavity, whereby the heat transfer between said liquid metal and base portions of said metal parts is increased.

28. A process according to claim 27, wherein said liquid bath within said welding cavity has a height at the end of the first stage of pouring operation in the range from $1/15$ of the height of said connecting ducts to the height of said connecting ducts.

29. A process according to claim 27, wherein gases which form in said rising channels are ventilated through closing gates connecting an upper side of said rising channels directly to atmosphere, and wherein the liquid metal solidifies when flowing through said closing gates.

30. A process according to claim 27, wherein gases which form in said rising channels are ventilated through closing gates connecting an upper side of said rising channels with an upper side of said welding cavity, and wherein the liquid metal solidifies when flowing through said closing gates.

31. A process according to claim 27, wherein the height of said liquid bath from said welding cavity after the end of the first stage of pouring operation and until an end of pouring operation increases with a speed inversely proportional with an area of cross-sections of the metal parts, whereby the heat transfer between said liquid metal and the metal parts is increased.

* * * * *